United States Patent [19]

Kumayama et al.

[11] Patent Number: 5,210,626
[45] Date of Patent: May 11, 1993

[54] HEAD-UP DISPLAY DEVICE

[75] Inventors: Tetsuro Kumayama, Yokohama; Toshiaki Majima, Tokyo; Naosato Taniguchi, Atsugi; Yoko Yoshinaga, Machida; Hiroyoshi Kishi, Atsugi; Nobuo Kushibiki, Yamato, all of Japan

[73] Assignee: Canon Kabushiki Kaisha, Tokyo, Japan

[21] Appl. No.: 585,918

[22] Filed: Sep. 21, 1990

[30] Foreign Application Priority Data

Sep. 27, 1989 [JP] Japan ................................. 1-251283

[51] Int. Cl.$^5$ .......................... G02B 5/32; G02B 27/14
[52] U.S. Cl. ....................................... 359/13; 359/572; 359/630; 340/705
[58] Field of Search ................. 340/705, 980; 350/3.7, 350/3.72, 174; 359/13, 14, 15, 19, 630, 631, 632, 633, 566, 572

[56] References Cited

U.S. PATENT DOCUMENTS

| | | | |
|---|---|---|---|
| 3,940,204 | 2/1976 | Withrington | 350/3.5 |
| 4,218,111 | 8/1980 | Withrington et al. | 350/3.72 |
| 4,613,200 | 9/1986 | Hartman | 350/3.7 |
| 4,711,512 | 12/1987 | Upatnieks | 350/3.7 |
| 4,763,990 | 8/1988 | Wood | 350/3.7 X |
| 4,932,731 | 6/1990 | Suzuki et al. | 350/3.7 |
| 5,035,473 | 7/1991 | Kuwayama et al. | 350/3.7 |

FOREIGN PATENT DOCUMENTS

| | | |
|---|---|---|
| 0007039 | 1/1980 | European Pat. Off. . |
| 0151455 | 8/1985 | European Pat. Off. . |
| 0273395 | 8/1988 | European Pat. Off. ............ 340/705 |
| 0278395 | 8/1988 | European Pat. Off. . |
| 0286962 | 10/1988 | European Pat. Off. . |
| 0344810 | 12/1989 | European Pat. Off. ............ 350/3.7 |
| 58317 | 3/1988 | Japan ................................. 340/705 |
| WO8805553 | 7/1988 | PCT Int'l Appl. . |

OTHER PUBLICATIONS

Banbury, J. R., "Wide Field of View Head-Up Display", Flight Systems Department, Royal Aircraft Establishment, U.K., 1982.

Primary Examiner—Bruce Y. Arnold
Assistant Examiner—David R. Parsons
Attorney, Agent, or Firm—Fitzpatrick, Cella, Harper & Scinto

[57] ABSTRACT

A head-up display device comprises an image generator, a beam combiner having a light receiving plane tilted laterally for receiving a light from the image generator and diffracting the light, and a compensator arranged between the image generator and the beam combiner for receiving the light from the image generator by a light receiving plane thereof and directing the light to the beam combiner to correct an aberration created by the beam combiner. The compensator is arranged such that a normal line extending through a center of the light receiving plane thereof and a normal line extending through a center of the light receiving plane of the beam combiner are in a common plane.

18 Claims, 4 Drawing Sheets

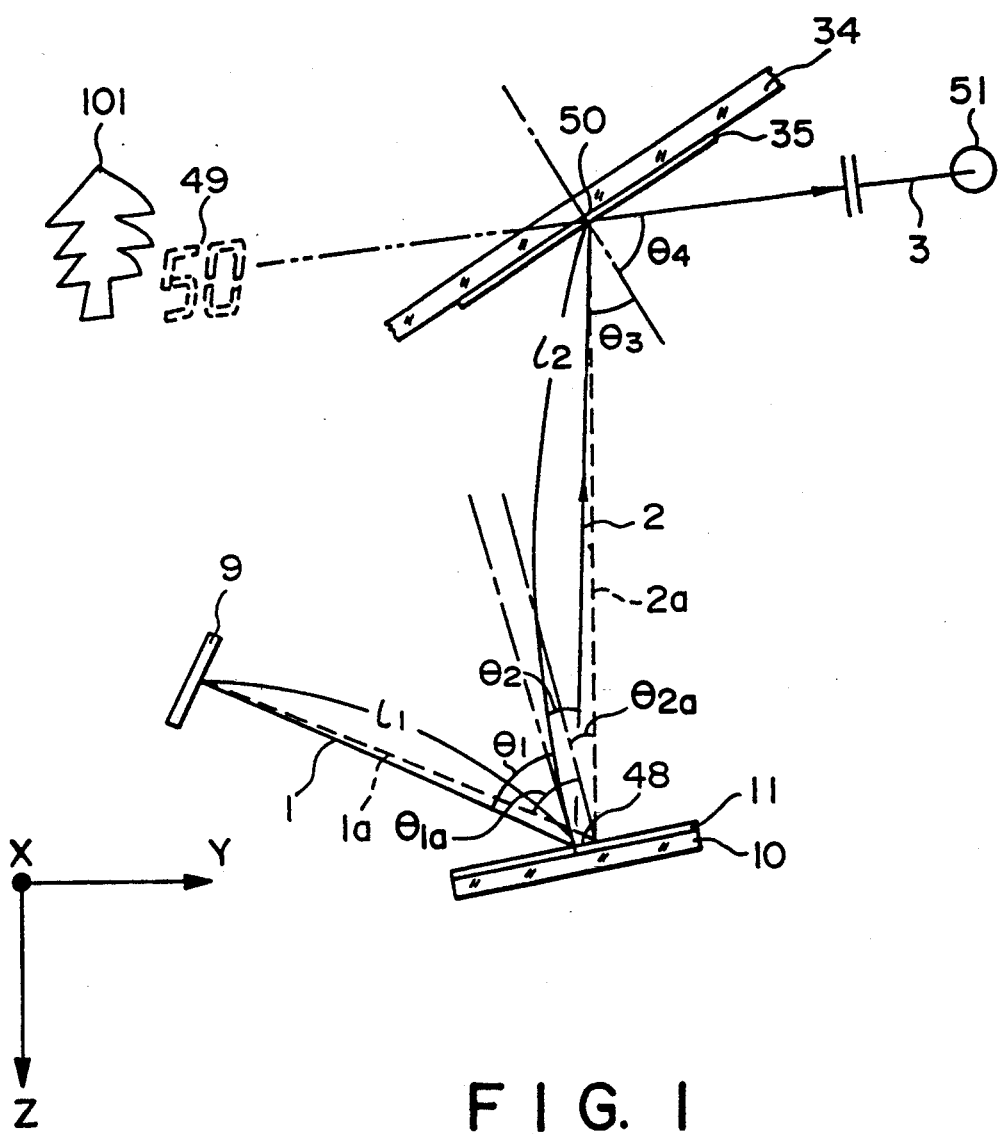
F I G. 1

HEAD-UP DISPLAY DEVICE

BACKGROUND OF THE INVENTION

1. Field of the Invention

The present invention relates to a head-up display device, and more particularly to a head-up display device which utilizes a beam combiner having a diffraction grating such as a hologram and which superimposes scenery in front of the device on an image generated by an image generator to allow observation thereof in one view field. A beam combiner of the present device may be mounted on a front glass of a car or aeroplane so that the image generated by the image generator such as a CRT or two-dimension LED array is displayed to an observer at a driver seat through the beam combiner.

2. Related Background Art

A display device of this type is disclosed in U.S. Pat. No. 4,218,111. In this type of device, it is also required to correct an aberration created by the diffraction grating of the beam combiner in order to clearly display the image. In the aberration correction, a chromatic aberration is an important factor where a band width of the light from the image generator is relatively wide.

In the past, in order to correct such an aberration created by the beam combiner, a relay optical system is arranged between the beam combiner and the image generator. However, even if the beam combiner is mounted on the front glass of the car facing the driver and the image generator and the relay optical system are arranged, it is not easy to correct the aberration for a periphery (off-axis) of the image, because the front glass curves laterally and the shape thereof is not laterally symmetric about a center axis of the car while the driver sits on the left or right side of the center axis and hence the front glass and the beam combiner laterally incline with respect to the relay optical system.

SUMMARY OF THE INVENTION

It is an object of the present invention to provide a head-up display device which allows easy correction of an aberration over an entire image screen.

In order to achieve the above object, a device in accordance with a first aspect of the present invention comprises an image generator, a beam combiner having a light receiving plane laterally tilted for receiving a light from the image generator and diffracting it, and a relay system arranged between the image generator and the beam combiner for receiving the light from the image generator at a light receiving plane thereof and directing the light toward the light receiving plane of the beam combiner. The relay system is arranged such that a normal line extending through a center of the light receiving plane of the relay system and a normal line extending through a center of the light receiving plane of the beam combiner are in an essentially common plane.

In order to achieve the above object, a device in accordance with a second aspect of the present invention comprises an image generator, a beam combiner having a light receiving plane laterally tilted for receiving a light from the image generator and diffracting it, and a compensator arranged between the image generator and the beam combiner for receiving the light from the beam generator at a light receiving plane thereof and directing the light toward the light receiving plane of the beam combiner to correct an aberration created by the beam combiner. The compensator is arranged such that a normal line extending through a center of the light receiving plane of the compensator and a normal line extending through a center of the light receiving plane of the beam combiner are in an essentially common plane.

Further, in order to achieve the above object, a device in accordance with a third aspect of the present invention comprises an image generator, a beam combiner having a hologram laterally tilted for reflecting and diffracting a light from the image generator, and a compensator arranged between the image generator and the beam combiner and having a diffraction grating for reflecting and diffracting the light from the image generator. The compensator directs the light toward the beam combiner and corrects a chromatic aberration created by the hologram. The compensator is arranged such that a normal line extending through a center of the diffraction grating and a normal line extending through a center of the hologram are in an essentially common plane.

In the devices of the first to third aspects, the image generator is preferably arranged such that a center of the image screen is in the above common plane. The image generator may be a CRT, LED array, liquid crystal display or plasma display.

Further, the compensator in the second or third aspect is preferably provided with a phase type diffraction grating for diffracting the light from the image generator. The phase type diffraction grating may be manufactured as a volume type or relief type grating. The beam combiner in the first, second or third aspect is preferably provided with a phase type diffraction grating for re-diffracting the diffracted lights from the compensator and the relay system. It is preferably a volume type or phase type diffraction grating. The beam combiner is constructed to function as a plane mirror or a concave mirror, and where it is provided with an optical power to function as the concave mirror, it is easy to display, in an enlarged scale, the image generated by the image generator.

BRIEF DESCRIPTION OF THE DRAWINGS

FIG. 1 shows a first embodiment of the present invention,

DETAILED DESCRIPTION OF THE PREFERRED EMBODIMENTS

Figure 2:
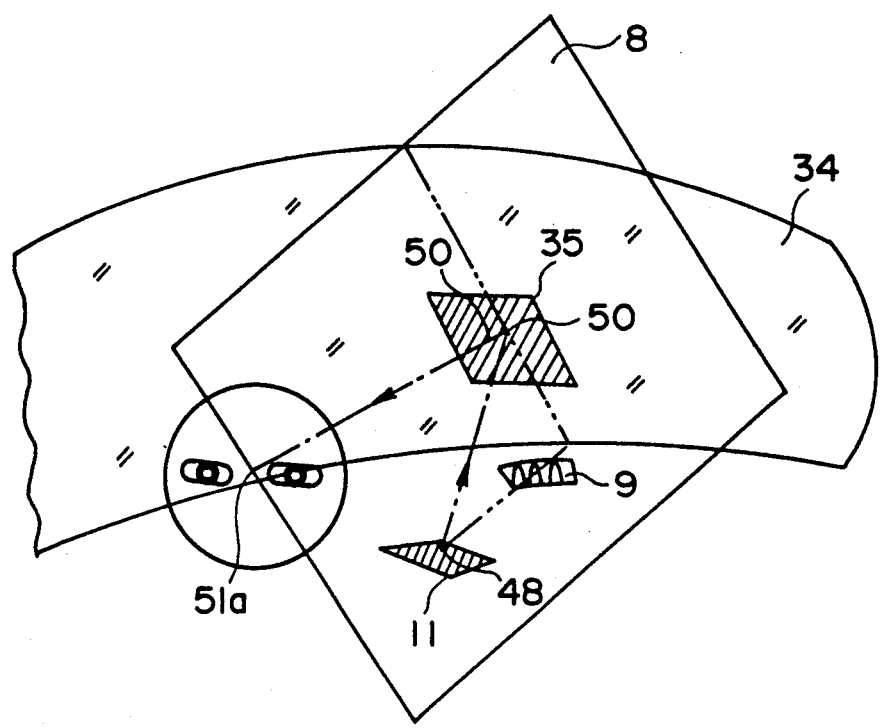
FIG. 2 shows the device of FIG. 1 when applied to a front glass of a car.

FIG. 1 shows a first embodiment of the present invention.

In FIG. 1, numeral 9 denotes a display (image generator) which is a self-light emitting type fluorescent light, CRT or the like for displaying information by using a light beam having a predetermined wavelength width. Numeral 11 denotes a first light deflection member which forms a relay optical system. The member 11 is a reflection type diffraction grating which exhibits different deflection angles (diffraction angles) depending on the wavelength and it is formed on a substrate 10. Numeral 35 denotes a second deflection member which forms a beam binder. Like the first light deflection member 11, the member 35 also is a diffraction grating which exhibits different deflection angles (diffraction angles) depending on the wavelength. It is fixed on a transparent substrate (front glass) 34.

A plane defined by a center of the display screen of the display 9, a center 48 of the first light deflection member 11 and a center 50 of the second light deflection member 35 is tilted with respect to the z-y plane, and the second light deflection member 35 is tilted, as viewed from an observer 51, with respect to a direction normal to the plane of the drawing (x-direction in FIG. 1) and arranged in a plane transverse to the x-z plane. A normal line extending through the center 48 and a normal line extending through the center 50 are in the above plane.

In the present embodiment, a light beam 1 (having a center wavelength of $\lambda_0$ emitted from the display 9 is directed to the first light deflection member 11 at an incident angle of $\theta_1$, reflected and diffracted by the member 11 and exits from the member 11 at an angle $\theta_2$ to produce a light beam 2. The light beam 2 is directed to the second light deflection member 35 at an incident angel of $\theta_3$, and reflected and diffracted by the member 35 and exits from the member 35 at an angle of $\theta_4$ and is directed in an emitting direction to a pupil of the observer 51.

A virtual image 49 of the information displayed on the display screen of the display 9 may be observed in front of the second light deflection member 35 in superposition to other information such as scenery 101.

In the present embodiment, when the displayed image is to be observed, the chromatic aberration of the image is corrected vertically of a view field. This is explained below.

In the present embodiment, light deflection member 11 is arranged such that a light beam 1a having a wavelength $\lambda_0+\Delta\lambda$ from the display 9 is directed to the first light deflection member 11 at an incident angle $\theta_{1a}$, reflected and diffracted at an exit angle $\theta_{2a}$, and directed to a point 50 on the second light deflection member 35.

In accordance with a law of diffraction of light, a diffraction angle varies with the wavelength of the light. Thus, the light beam having the wavelength $\lambda_0+\Delta\lambda$ and the light beam having the wavelength $\lambda_0$ reach the pupil of the observer 51 through the same light path 3. As a result, the virtual image 49 is formed with a vertical chrominance shift.

Assuming that the length from the display 9 to the first light deflection member 11 is $l_1$ and the length from the first light deflection member 11 to the second light deflection member 35 is $l_2$, the device of the present embodiment is designed to meet the following relationship for the correction of the chromatic aberration.

$$\frac{l_2}{l_1} = \left(\frac{P_2}{P_1}\right)\frac{\cos\theta_3 \cdot \cos\theta_2}{\cos\theta_1} - \frac{\cos^2\theta_2}{\cos^2\theta_1} \quad (1)$$

where $P_1$ and $P_2$ are pitches of the diffraction gratings of the first and second light deflection members 11 and 35, respectively and they are given by $$P_1=\lambda_0/|\sin\theta_1-\sin\theta_2| \quad (2)$$

$$P_2=\lambda_0/|\sin\theta_3-\sin\theta_4| \quad (3)$$

Specific numerical examples of the present embodiment are described below.

The diffraction grating of the first light deflection member 11 is a linear equi-spaced relief type diffraction grating which has a grating of about 1200 lines/mm. The pitch $P_1$ is 0.833 $\mu$m. The member may be formed on the rear side of the substrate 10. The center wavelength $\lambda_0=510$ nm, the angle $\theta_1=55°$ and the angle $\theta_2=12°$.

On the other hand, the second light deflection member 35 is a reflection type and volume phase type diffraction grating which primarily consists of poly (N-vinyl carbazole). The in-plane pitch $P_2$ is 1.5 $\mu$m at the point 50, the angle $\theta_3=34.5°$ and the angle $\theta_4=65°$.

By placing the above numerical data into the formula (1), we get $$(l_2/l_1)=1.5$$

when $l_1=140$ mm and $l_2=210$ mm, the chromatic aberration for the virtual image 49 is well corrected.

While the member 11 is a relief type diffraction grating in the present embodiment, it may be other types of diffraction gratings such as a volume type diffraction grating.

FIG. 2 shows an embodiment in which the device of FIG. 1 is applied to a car with a right hand steering wheel. In FIG. 2, a center of a volume phase type diffraction grating of the second light deflection member 35 fixed to a front glass 34, a center 48 of a diffraction grating of the first light diffraction member 11 and a center of the display 9 are arranged on a plane 8, and a pupil of an observer 51a is also essentially in the plane 8. The plane 8 is tilted by 5 degrees with respect to the z-x plane shown in FIG 1.

In the head-up display device of FIG. 2, it is possible to correct the aberration over a wide display area.

In FIG. 1, it is at the center 50 of the image that the chromatic shift in observing the displayed image is correct. In the present embodiment, since the diffraction grating 11 and the diffraction grating 35 are laterally symmetrically arranged with respect to the plane 8, it is possible to correct the aberration of any point along a line extending from a front side to a rear side of the plane of drawing of FIG. 1 (laterally of the device) in the same manner as that for the point on the plane of drawing. Thus, the aberration is corrected so that a sharp image can be observed on the laterally extending line.

A method for correcting the chromatic shift over the two-dimensional wide area in the present embodiment is now explained.

Figure 3:
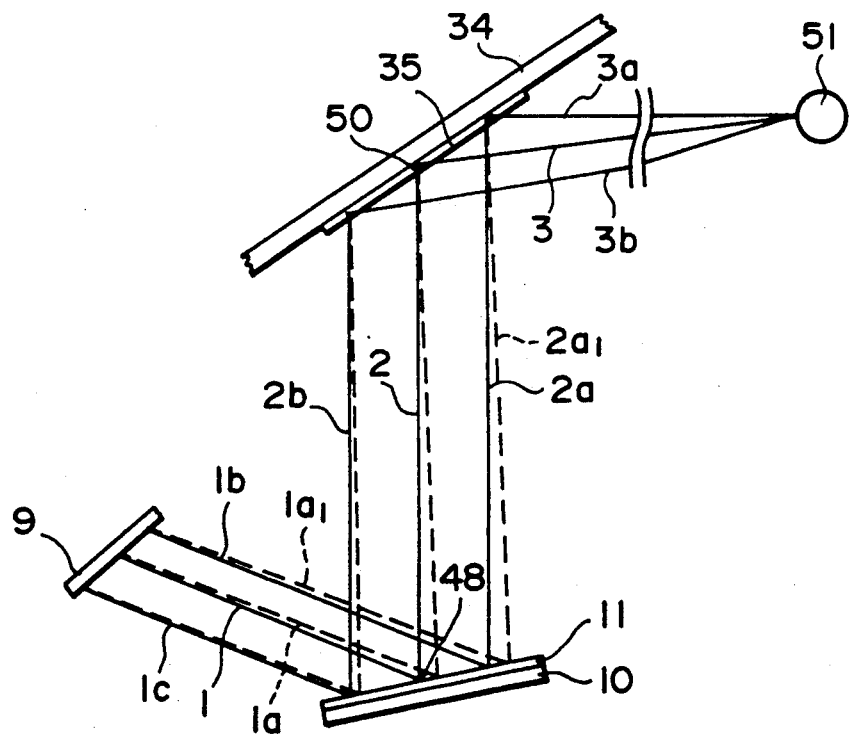
FIG. 3 shows an improvement of the first embodiment.

FIG. 3 shows a head-up display device which is an improvement over the device of FIG. 1 to correct the chromatic shift over a wide vertical and lateral area. In FIG. 3, the pupil of the observer 51 is displaced by 800 mm from the center 50 of the diffraction grating 35 on the transparent substrate (front glass) 34, and a focal distance of the diffraction grating 35 is 800 mm. The diffraction grating 11 is a planar linear equi-spaced grating.

The light beam 1 emitted from the center of the display 9 is reflected and diffracted by the diffraction grating 11 into a light beam 2, which in turn is reflected and diffracted by the diffraction grating 35 into a light beam 3, which is then directed to the pupil of the observer 51.

On the other hand, the light path of the light beam 1b from the upper edge of the display 9 is essentially parallel to the light beam 1 and it is sequentially diffracted by the diffraction gratings 11 and 35 into light beams 2a and 3a, respectively, and the light beam is finally directed to the pupil of the observer 51. There are many ways of correcting defocusing of the image due to the chromatic shift for the light beam. In a simplest way, the display 9 is vertically tilted by an appropriate angle. The light beam having the wavelength $\lambda_0 + \Delta\lambda$ is converted to the light beams $1a_1$ and $2a_1$ sequentially, and the light beam is superimposed on the light beam 3a and directed to the pupil of the observer 51.

The light beam 1c from the lower edge of the display 9 is also sequentially converted to the light beams 2b and 3b, and the light beam is directed to the pupil of the observer 51.

As described above, if the aberration due to the chromatic shift is well corrected laterally in the laterally symmetric optical system, the aberration can be well corrected vertically, too. As a result, the two-dimensional aberration correction is attained.

FIG. 4 illustrates an effect of the aberration correction on the display screen, by the optical system of the head-up display of the present embodiment.

In FIG. 4, an area A indicates an area in which the aberration correction is done well, that is, a defocusing amount is no larger than 0.1° (6 minutes), an area B indicates an area having a permissible defocusing amount, for example, less than 0.8° (48 minutes), and an area C indicates an area which has an impermissibly large defocusing amount.

Figure 4A:
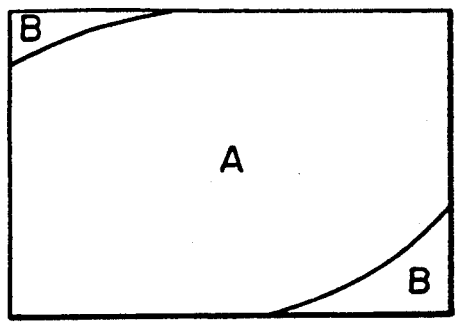
FIGS. 4A to 4C show comparison of effects of aberration correction by the present device and a prior art head-up display device.

FIG. 4A shows a distribution of image quality in the display screen of the device of FIG. 3. The aberration is well corrected over the entire screen.

Figure 4B:
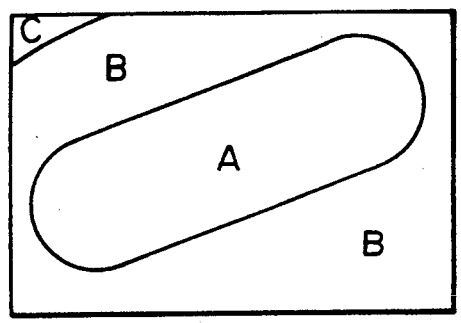

FIG. 4B shows a distribution of image quality of the display screen of the device shown in FIG. 1. When compared with FIG. 4A, the high quality area A is a little bit smaller but it is an improvement over the prior art.

Figure 4C:
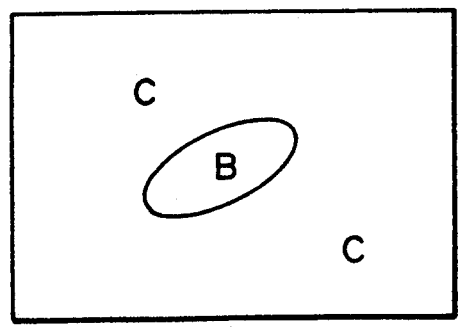

FIG. 4C shows a prior art display screen. The image quality is degraded over the entire area except for the center area.

Figure 5:
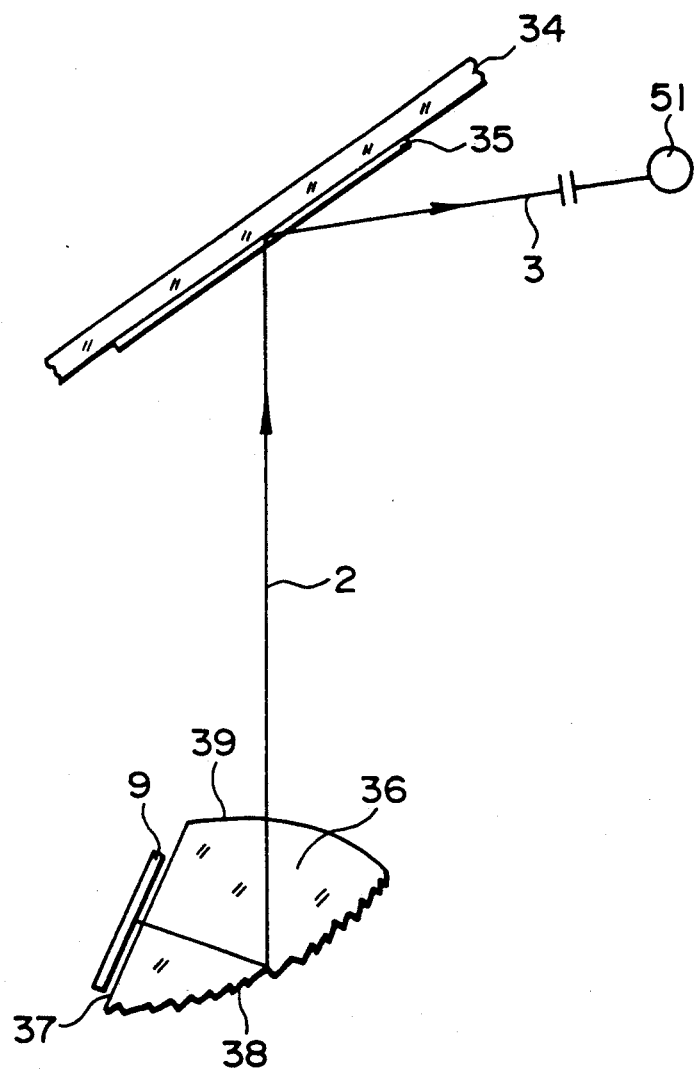
FIG. 5 shows a second embodiment of the present invention.

FIG. 5 shows a major portion of the optical system of the second embodiment of the present invention.

In FIG. 5, a relay optical system comprises a planar incident surface 37, a grating surface 38 having a relief diffraction grating formed on a spherical or cylindrical surface, and a spherical surface or nonspherical surface 39 which is rotation-symmetric or laterally symmetric with respect to an optical axis of the system. By the combination of those surface 37, 38 and 39 and the diffraction grating 35 on the transparent substrate 34, the chromatic shift (chromatic aberration) as well as other aberrations such as astigmatism and coma aberration are corrected.

In the present embodiment, the normal line extending through the center of the display screen of the display 9, the normal line extending through the center of the diffraction grating 38 and the normal line extending through the center of the diffraction grating 11 are in the same plane which is tilted with respect to a perpendicular direction.

Where a non-spherical surface is used for the surface 39, the lateral symmetry is a great advantage. In the prior art device, when a non-spherical surface is designed, the non-spherical surface is necessarily laterally asymmetric and it is very difficult to design such a surface and also very difficult to manufacture, test and correctly position the optical member.

In the present embodiment, since the laterally symmetric optical system is arranged on the tilt, the laterally symmetric non-spherical surface may be used and the chromatic shift and the astigmatism at the center of the display screen are easily corrected and aberration correction area can be vertically and laterally expanded.

In the above embodiments, the diffraction gratings of the beam combiner and the relay optical system are reflection type diffraction gratings. In the present invention, at least one of them may be a transparent type diffraction grating. The present invention is also applicable to vehicles other than cars or aeroplanes.

What is claimed is:

1. A head-up device, comprising:
    an image generator for emitting light;
    a beam combiner having a first light receiving surface for receiving light from said image generator and diffracting light in an emitting direction toward an observer, wherein said beam combiner is tilted laterally with respect to the emitting direction and extends in a viewing plane not perpendicular to the emitting direction; and
    a compensator having a second light receiving surface for receiving the light generated by said image generator and directing the light to the first light receiving surface of said beam combiner to correct an aberration created by said beam combiner,
    said compensator being arranged such that a second axis perpendicular to a center of the second light receiving surface and a first axis perpendicular to a center of the first light receiving surface of said beam combiner are substantially in a common plane.

2. A head-up display device according to claim 1, wherein said beam combiner includes a hologram for reflectivity diffracting the light.

3. A head-up display device according to claim 1 or 2, wherein said compensator diffracts the light to direct the light to the first light receiving surface of said beam combiner.

4. A head-up display device according to claim 3, wherein said compensator reflectively diffracts the light.

5. A head-up display device according to claim 4, wherein said compensator includes a relief type diffraction grating for reflectively diffracting the light.

6. A head-up display device according to claim 5, wherein said image generator includes a screen for displaying an image and is arranged such that a line normal to said screen, intersecting at its center, is disposed substantially in the common plane.

7. A head-up display device according to claim 6, wherein said beam combiner has an optical power.

8. A car head-up display device, comprising:
    an image generator;
    a beam combiner having a hologram formed on a front glass, said hologram reflectively diffracting a light emitted from said image generator along an emitting direction toward an observer and being tilted laterally with respect to the emitting direction and disposed in a viewing plane not perpendicular to the emitting direction; and
    a compensator having a diffraction grating for reflectively diffracting the light from said image generator and directing the light to said beam combiner to correct a chromatic aberration generated by said hologram, said compensator being arranged such that a second axis perpendicular to a center of said diffraction grating and a first axis perpendicular to a center of said hologram are substantially in a common plane.

9. A car head-up display device according to claim 8, wherein said image generator has a screen for displaying an image and is arranged such that a line normal to said screen, intersecting at its center is disposed substantially in the common plane.

10. A car head-up display device according to claim 9 wherein said hologram has an optical power.

11. A car head-up display device according to claim 8, wherein said diffraction grating is a relief type diffraction grating.

12. A head-up display device, comprising:
an image generator;
a beam combiner having a first light receiving surface for receiving light from said image generator and diffracting the light in an emitting direction toward an observer, wherein said beam combiner is tilted laterally with respect to the emitting direction and extends in a viewing plane not perpendicular to the emitting direction; and
a relay system having a second light receiving surface for receiving the light generated by said image generator and directing the light to the first light receiving surface of said beam combiner,
said relay system being arranged such that a second axis perpendicular to a center of the second light receiving surface and a first perpendicular to a center of the first light receiving surface of said beam combiner are substantially in a common plane.

13. A head-up display device according to claim 12, wherein said image generator has a screen for displaying an image and is arranged such that a line normal to said screen, intersecting at its center, is disposed substantially in the common plane.

14. A head-up display device according to clam 12 or 13, wherein said relay system includes a diffraction grating for diffracting the light from said image generator and directing the light to the first light receiving plane of said beam combiner.

15. A head-up display device according to claim 14, wherein said beam combiner has an optical power.

16. A head-up display device according to claim 15, wherein said relay system has a nonspherical surface.

17. A display device comprising:
an image generator;
a beam combiner having a first light receiving surface which receives light from said generator and diffracts the light; and
a compensator having a second light receiving surface for receiving light from said generator and directing it to said first light receiving surface to correct an aberration generated by said combiner, wherein a plane defined by an optical axis of the light incident on said combiner and an optical axis of the light diffracted and emerged from said combiner is tilted with respect to a vertical direction.

18. A display according to claim 17, wherein:
said compensator reflects and diffracts light emitted from said generator and directs the light to a light receiving plane of said beam combiner.

* * * * *

UNITED STATES PATENT AND TRADEMARK OFFICE
CERTIFICATE OF CORRECTION

PATENT NO. : 5,210,626
DATED : May 11, 1993
INVENTOR(S) : Tetsuro Kuwayama, et al.

It is certified that error appears in the above-indentified patent and that said Letters Patent is hereby corrected as shown below:

On the title page, item (19):

"Kumayama et al." should read --Kuwayama et al.--.

[75] INVENTORS:

"Tetsuro Kumayama," should read --Tetsuro Kuwayama,--.

COLUMN 3:

Line 20, "$\lambda_0$" should read --$\lambda_0)$--.
Line 27, "$\theta 4$" should read --$\theta_4$--.

COLUMN 5:

Line 52, "surface 37," should read --surfaces 37,--.

COLUMN 6:

Line 17, "head-up device," should read --head-up display device,--.

UNITED STATES PATENT AND TRADEMARK OFFICE
CERTIFICATE OF CORRECTION

PATENT NO. : 5,210,626
DATED : May 11, 1993
INVENTOR(S) : Tetsuro Kuwayama, et al.

It is certified that error appears in the above-indentified patent and that said Letters Patent is hereby corrected as shown below:

COLUMN 7:

Line 13, "9" should read --9,--.
Line 33, "first" should read --first axis--.

COLUMN 8:

Line 30, "display" should read --display device--.

Signed and Sealed this

Ninth Day of November, 1993

Attest:

BRUCE LEHMAN

Attesting Officer

Commissioner of Patents and Trademarks